(12) United States Patent
Takeda

(10) Patent No.: US 11,081,246 B2
(45) Date of Patent: Aug. 3, 2021

(54) COOLING AIR AMOUNT ADJUSTMENT DEVICE OF CONCRETE CASK AND CONCRETE CASK

(71) Applicant: CENTRAL RESEARCH INSTITUTE OF ELECTRIC POWER INDUSTRY, Tokyo (JP)

(72) Inventor: Hirofumi Takeda, Chiba (JP)

(73) Assignee: CENTRAL RESEARCH INSTITUTE OF ELECTRIC POWER INDUSTRY

( * ) Notice: Subject to any disclaimer, the term of this patent is extended or adjusted under 35 U.S.C. 154(b) by 835 days.

(21) Appl. No.: 15/335,514

(22) Filed: Oct. 27, 2016

(65) Prior Publication Data

US 2017/0125132 A1 May 4, 2017

(30) Foreign Application Priority Data

Oct. 30, 2015 (JP) .............................. JP2015-214560

(51) Int. Cl.
*G21F 5/10* (2006.01)
*G21C 19/04* (2006.01)
*G21C 19/06* (2006.01)
*G21F 9/34* (2006.01)
*G21F 9/36* (2006.01)

(52) U.S. Cl.
CPC ............. *G21C 19/04* (2013.01); *G21C 19/06* (2013.01); *G21F 5/10* (2013.01); *G21F 9/34* (2013.01); *G21F 9/36* (2013.01)

(58) Field of Classification Search
CPC . G21F 5/008; G21F 5/015; G21F 5/10; G21C 9/004; G21C 9/34; G21C 9/36
See application file for complete search history.

(56) References Cited

U.S. PATENT DOCUMENTS 3,365,366 A * 1/1968 Cundill .................. G21C 1/326
376/210
4,836,443 A * 6/1989 Wolters .................... G21C 9/00
122/504

(Continued)

FOREIGN PATENT DOCUMENTS

JP      2001356192 A  * 12/2001
JP       200375586 A     3/2003

(Continued)

OTHER PUBLICATIONS

Wataru, Masumi, et al. "Thermal hydraulic analysis compared with tests of full-scale concrete casks." Nuclear Engineering and Design 238.5 (2008): 1213-1219.*

*Primary Examiner* — Lily C Garner
(74) *Attorney, Agent, or Firm* — The Webb Law Firm

(57) ABSTRACT

A cooling air amount adjustment device of a concrete cask is provided. The device includes at least one of an air outlet port opening level adjustment mechanism and an air inlet port opening level adjustment mechanism which are adapted to automatically perform adjustment to reduce a flow rate of a cooling air when a temperature of the cooling air at an air outlet port is lower than an adjustment reference temperature, and adjustment to increase the flow rate of the cooling air so as to restore the flow rate of the cooling air when the temperature of the cooling air at the air outlet port is higher than the adjustment reference temperature.

11 Claims, 8 Drawing Sheets

(56) References Cited

U.S. PATENT DOCUMENTS

| | | | | |
|---|---|---|---|---|
| 4,987,313 | A * | 1/1991 | Baatz | G21F 5/005 |
| | | | | 159/47.3 |
| 7,372,933 | B2 * | 5/2008 | Ohsono | G21F 5/12 |
| | | | | 376/272 |
| 7,601,260 | B2 * | 10/2009 | Amesoeder | B01J 47/012 |
| | | | | 210/171 |
| 8,822,963 | B2 * | 9/2014 | Loewen | F01K 25/065 |
| | | | | 250/505.1 |
| 9,536,629 | B2 * | 1/2017 | Dederer | G21C 15/18 |
| 2003/0002614 | A1 * | 1/2003 | Matsunaga | G21F 5/12 |
| | | | | 376/272 |
| 2003/0057655 | A1 * | 3/2003 | Chehab | F16J 15/008 |
| | | | | 277/500 |
| 2014/0177775 | A1 * | 6/2014 | Loewen | G21H 1/103 |
| | | | | 376/272 |
| 2014/0247916 | A1 * | 9/2014 | Singh | G21F 5/06 |
| | | | | 376/272 |

FOREIGN PATENT DOCUMENTS

| | | | | | |
|---|---|---|---|---|---|
| JP | | 2003075586 | A | * | 3/2003 |
| JP | | 2004233055 | A | * | 8/2004 |
| JP | | 2005265443 | A | * | 9/2005 |
| JP | | 2006058010 | A | * | 3/2006 |
| JP | | 2007108052 | A | * | 4/2007 |
| JP | | 2010145111 | A | * | 7/2010 |
| WO | WO-2012171748 | A1 | * | 12/2012 | ............... G21F 5/06 |

\* cited by examiner

PRIOR ART

COOLING AIR AMOUNT ADJUSTMENT DEVICE OF CONCRETE CASK AND CONCRETE CASK

CROSS-REFERENCE TO RELATED APPLICATION

This application claims priority to Japanese Patent Application No. 2015-214560 filed Oct. 30, 2015, the disclosure of which is hereby incorporated in its entirety by reference.

BACKGROUND

Technical Field

The present invention relates to a cooling air amount adjustment device of a concrete cask and a concrete cask. More specifically, the present invention relates to improvement for a cooling system of a concrete cask.

Related Art

In a concrete cask storage system that is an intermediate storage system for spent nuclear fuel, the spent nuclear fuel is sealed in a canister, and the canister is stored in a manner being housed inside a concrete container. Since fission products contained inside the spent nuclear fuel continue decaying even after extraction from a nuclear reactor, the canister continues generating heat also while storing the spent nuclear fuel. Therefore, the concrete cask is provided with a passage adapted to introduce external air inside as cooling air, make the external air as the cooling air flow inside by natural convection, and discharge the same after cooling the canister.

In the concrete cask storage system, for example, a canister made of general-purpose austenitic stainless steel such as SUS304L or SUS316L is used in many cases. In the case where the canister made of stainless steel is used, it is necessary to take measures to prevent occurrence of stress corrosion cracking (referred to as "SCC") caused by salt. For example, in the case where a storage facility of the concrete cask is installed on shore, sea salt particles brought by winds from the sea are contained in external air introduced as the cooling air. Therefore, the sea salt particles may adhere to a surface of the canister in the process of cooling the canister.

When the sea salt particles adhering to the surface of the canister are in a wet state, SCC may occur. Furthermore, even in the case where there is no adhesion of such sea salt particles, there may be problems in which dew condensation occurring on the surface of the canister causes corrosion of the canister and acceleration of deterioration/degradation. In order to prevent occurrence of SCC and corrosion, it is effective to keep the surface of the canister at a temperature not causing dew condensation.

However, considering a fact that decay heat of the spent nuclear fuel becomes largest in an early stage of storage, cooling capacity of the concrete cask is determined based on a heat generation amount of the canister in the early stage of storage. Therefore, the cooling capacity may become excessively large relative to the heat generation amount of the canister in a final stage of storage. In this case, the canister is cooled excessively, and dew condensation may occur on the surface of the canister.

Therefore, considering decrease of a surface temperature of the canister in the final stage of storage, for example, a technology disclosed in JP 2003-75586 A adopts measures to prevent occurrence of SCC by reducing a flow rate of cooling air by partly blocking an air inlet/outlet ports of a concrete cask with blocks, preventing the canister from being excessively cooled, and preventing occurrence of dew condensation on the surface of the canister.

According to the technology disclosed in JP 2003-75586 A, the measures to partly block the air inlet/outlet ports of the concrete cask with the blocks is performed by a worker based on man-made judgment. However, considering a storage term, number of storage systems, and the like of the concrete cask, it is extremely complex to control the concrete cask through man-made judgment and operation. Furthermore, in the case of control the concrete cask through the man-made judgment and operation, a sufficient check system is required for the man-made judgment and operation in order to surely avoid a human error, and an immense management load may be considered.

Furthermore, according to the measures using the man-made judgment and operation like the technology disclosed in JP 2003-75586 A, immediately coping with unexpected temperature change of the external air and the like during the storage term may be impossible, and there may be also concern that cooling for the canister is unexpectedly accelerated.

SUMMARY

The present invention is directed to providing a cooling air amount adjustment device of a concrete cask and a concrete cask, in which a canister is prevented from being excessively cooled without need for any man-made judgment and operation, and dew condensation that may cause corrosion of the canister and acceleration of deterioration/degradation can be surely prevented from occurring on the surface of the canister.

A cooling air amount adjustment device of a concrete cask according to the present invention is adapted to: naturally convect external air as cooling air from an air inlet port provided at a lower portion of a concrete container to an air outlet port provided at an upper portion thereof; and store and simultaneously cool a canister sealing spent nuclear fuel. The cooling air amount adjustment device includes at least one of an air outlet port opening level adjustment mechanism and an air inlet port opening level adjustment mechanism which are adapted to automatically perform adjustment to reduce a flow rate of the cooling air when a temperature of the cooling air at the air outlet port is lower than an adjustment reference temperature, and furthermore adjustment to increase the flow rate of the cooling air so as to restore the flow rate of the cooling air when the temperature of the cooling air at the air outlet port is higher than the adjustment reference temperature.

According to the present invention, it becomes possible to cope with unexpected temperature change of the external air and the like during the storage term without need for any man-made judgment and operation, the canister is prevented from being excessively cooled, and dew condensation that may cause corrosion of the canister and acceleration of deterioration/degradation can be surely prevented from occurring on the surface of the canister.

DETAILED DESCRIPTION

In the following, embodiments of the present invention will be described in detail based on the drawings. In the following description, a cooling air amount adjustment device of a concrete cask according to the present invention may be referred to simply as a cooling air amount adjustment device.

Figure 7:
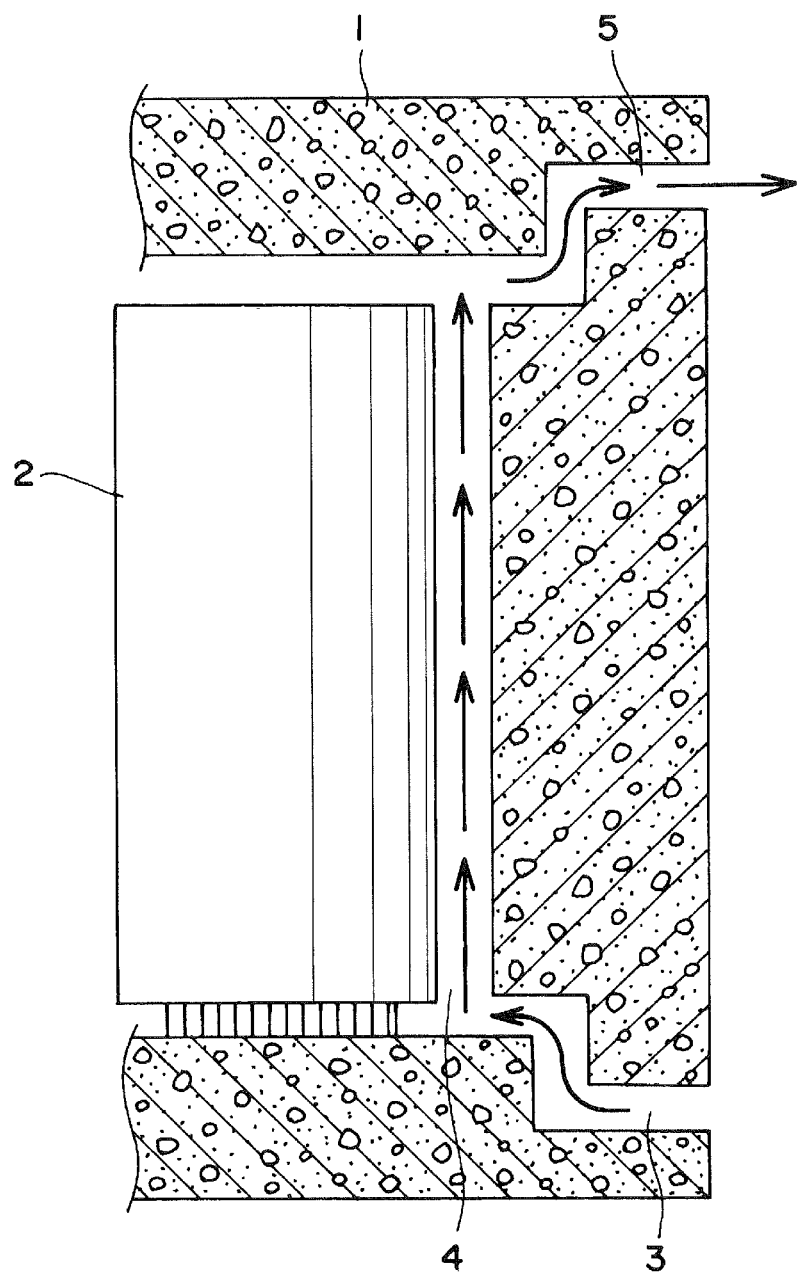
FIG. 7 is a vertical cross-sectional view of a concrete cask in the related art.

As an embodiment, a description will be provided by exemplifying a case where the present invention is applied to a concrete cask in the related art illustrated in FIG. 7.

The concrete cask illustrated in FIG. 7 includes a general structure related to a passage provided with the purpose that external air introduced inside as cooling air is made to flow and discharged. The external air as the cooling air in the concrete cask is introduced from an air inlet port 3 provided at a lower portion of a concrete container 1, and then moves up through a cooling passage 4 between the concrete container 1 and the canister 2, and is discharged from an air outlet port 5 provided at an upper portion of the concrete container 1. The cooling air cools the canister 2 in the process of passing through the cooling passage 4. At this point, the cooling air moves up by being heated by heat generation from the canister 2. Therefore, the cooling air sequentially flows through the air inlet port 3, the cooling passage 4, and the air outlet port 5 by natural convection.

Figure 1:
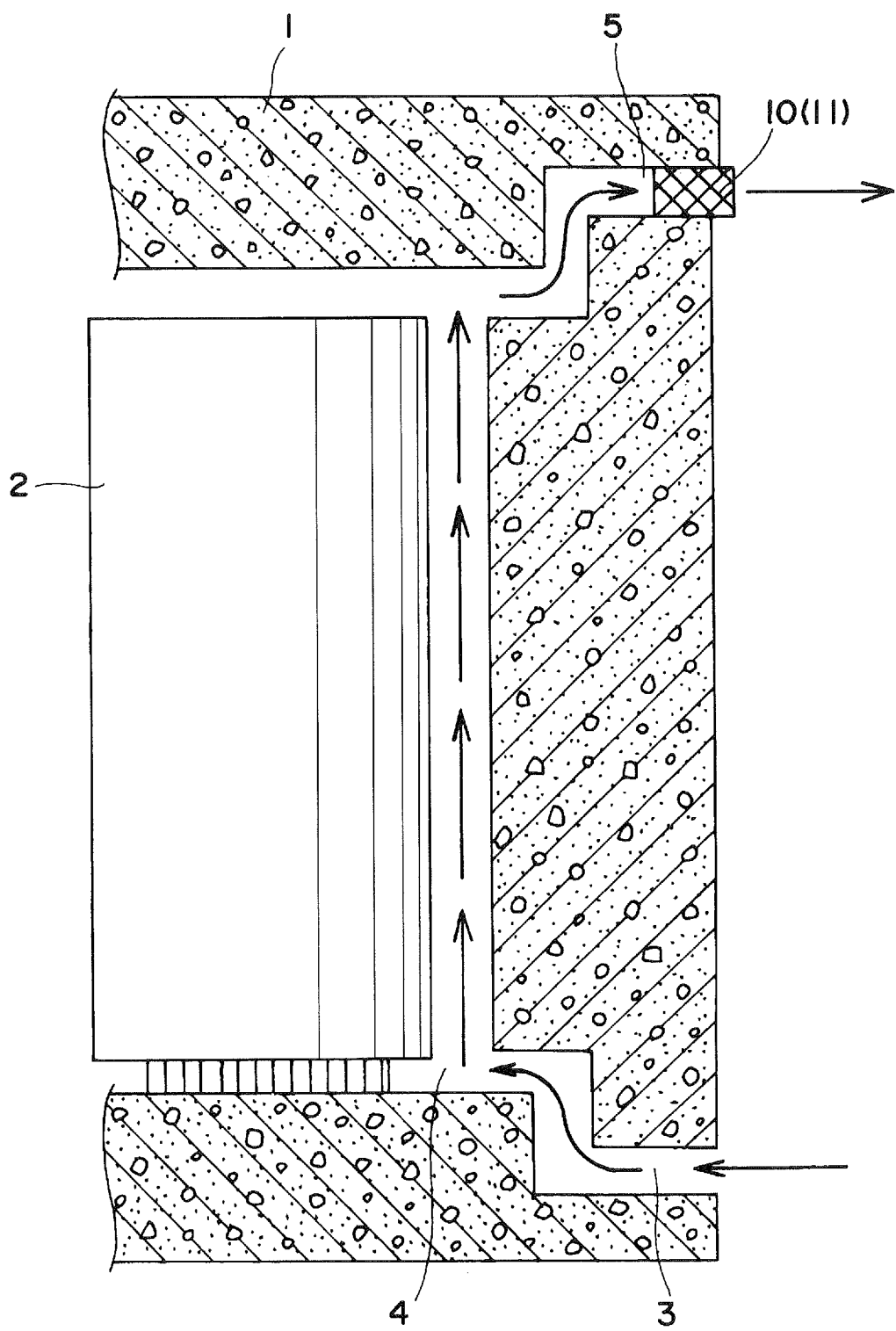
FIG. 1 is a vertical cross-sectional view exemplifying a case including an air outlet port opening level adjustment mechanism as an embodiment of a cooling air amount adjustment device of a concrete cask according to the present invention.

A cooling air amount adjustment device 10 automatically adjusts a flow rate of the cooling air when there may be a risk of excessively cooling the canister 2. Automatic adjustment of the flow rate of the cooling air is performed by at least one of an air outlet port opening level adjustment mechanism 11 and an air inlet port opening level adjustment mechanism 13. More specifically, adjustment to reduce the flow rate of the cooling air when a temperature of the cooling air at the air outlet port 5 is lower than an adjustment reference temperature and adjustment to increase the flow rate of the cooling air so as to restore the flow rate of the cooling air when the temperature of the cooling air at the air outlet port 5 is higher than the adjustment reference temperature are automatically performed by at least one of the air outlet port opening level adjustment mechanism 11 and the air inlet port opening level adjustment mechanism 13. Meanwhile, the cooling air amount adjustment device 10 illustrated in FIG. 1 is assumed to be an embodiment that automatically adjusts the flow rate of the cooling air by the air outlet port opening level adjustment mechanism 11, but the flow rate may also be automatically adjusted by the air inlet port opening level adjustment mechanism 13, and furthermore, the flow rate of the cooling air may also be automatically adjusted by both of the air outlet port opening level adjustment mechanism 11 and the air inlet port opening level adjustment mechanism 13.

Here, "when there may be a risk of excessively cooling the canister 2" means when there may be a risk in which dew condensation occurs at least in a part of a surface of the canister 2. At this point, the temperature of the cooling air after passing through the cooling passage 4, specifically, the temperature of the cooling air at the air outlet port 5 decreases to a temperature that reflects a fact that there may be the risk in which dew condensation occurs at least in the part of the surface of the canister 2. At this timing, adjustment to reduce the flow rate of the cooling air is automatically performed. Specifically, a temperature corresponding to "when there may be a risk of excessively cooling the canister 2" is preliminarily set as the adjustment reference temperature for temperature control in the concrete cask. Furthermore, when the temperature of the cooling air at the air outlet port 5 is lower than the adjustment reference temperature, adjustment to reduce the flow rate of the cooling air is performed. Meanwhile, in the following description, the temperature of the cooling air at the air outlet port 5 after passing through the cooling passage 4 may be referred to as "outlet air temperature". Additionally, adjustment to reduce the flow rate of the cooling air when the temperature of the cooling air at the air outlet port 5 is lower than the adjustment reference temperature may be referred to as "first adjustment".

By reducing the flow rate of the cooling air in accordance with decrease of the outlet air temperature by the first adjustment, a cooling effect on the canister 2 by the cooling air can be reduced, and the canister 2 can be prevented from excessively being cooled. Consequently, dew condensation can be prevented from occurring on the surface of the canister 2 by keeping an entire surface of the canister 2 at a temperature not causing dew condensation.

On the other hand, in the case where the flow rate of the cooling air is continuously reduced in accordance with decrease of the outlet air temperature by the first adjustment, heat generation of the canister 2 exceeds the cooling effect on the canister 2 by the cooling air in due course, and the outlet air temperature switches to rising. When this state is kept, the temperature of the canister 2 continues rising.

Therefore, in the present invention, in a stage when the outlet air temperature switches to rising, the flow rate of the cooling air is increased in accordance with rising of the outlet air temperature. In other words, the flow rate of the cooling air that has been reduced by the first adjustment is made to be restored. Specifically, when the temperature of the cooling air at the air outlet port 5 is higher than the adjustment reference temperature, the flow rate of the cooling air is increased so as to restore the flow rate of the cooling air. Consequently, the temperature of the canister 2 can be suppressed from rising. Meanwhile, in the following description, adjustment to increase the flow rate of the cooling air so as to restore the flow rate of the cooling air when the temperature of the cooling air at the air outlet port 5 is higher than the adjustment reference temperature may be referred to as "second adjustment".

By performing the first adjustment and the second adjustment and furthermore by repeating these adjustments, the outlet air temperature converges within a predetermined range, and also the flow rate of the cooling air is limited to an appropriate amount. In other words, the surface of the canister 2 is continuously kept at a low temperature within a temperature range not causing dew condensation on the surface of the canister 2, and also the flow rate of the cooling air is continuously kept at a small amount. For example, when the surface temperature of the canister 2 is 100° C. or higher, dew condensation is prevented from occurring on the surface of the canister 2. Therefore, for example, by setting the outlet air temperature to the adjustment reference temperature when the surface temperature of the canister 2 is 100° C., the surface of the canister 2 is continuously kept at the low temperature within the temperature range not causing dew condensation, and also the flow rate of the cooling air is continuously kept at the small amount. However, note that the adjustment reference temperature is not limited this temperature. The adjustment reference temperature may also be set to a lower temperature within the temperature range not causing dew condensation on the surface of the canister 2. Furthermore, the adjustment reference temperature may also be set to a higher temperature within a temperature range in which concrete constituting the concrete container 1 can be kept at a temperature sufficiently lower than a limit temperature of the concrete.

Therefore, for example, when there may be a risk that the canister 2 is excessively cooled in the final stage of storage, the flow rate of the cooling air is immediately, appropriately, and automatically adjusted, and dew condensation can be prevented from occurring on the surface of the canister 2. Furthermore, an introducing amount of salt into the concrete cask, which may become a basic factor of occurrence of SCC, can be reduced by limiting an introducing amount of the external air as the cooling air to an amount necessary for cooling. Occurrence of SCC is surely prevented by combination of these effects.

In the following, a description will be provided for a case where the flow rate of the cooling air is adjusted by the air outlet port opening level adjustment mechanism 11 adapted to adjust an opening level of the air outlet port 5.

Figure 2A:
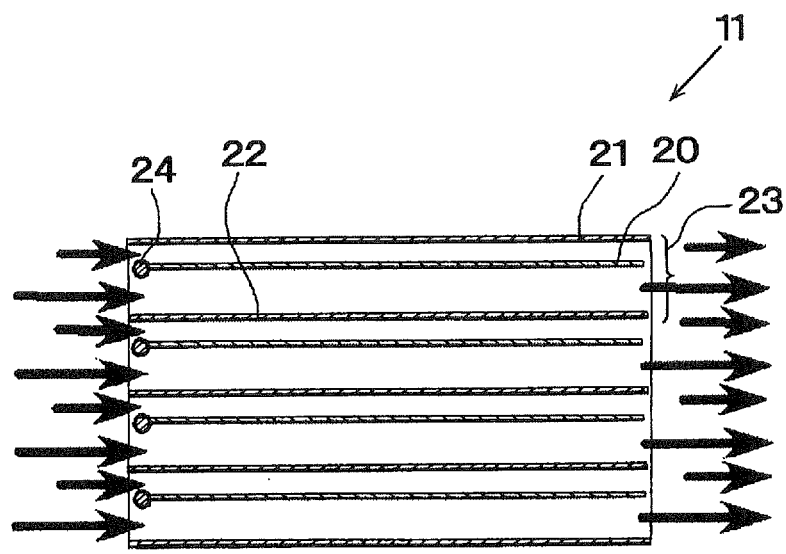
FIGS. 2A and 2B are diagrams illustrating an example of an embodiment including a temperature-sensitive member as the air outlet port opening level adjustment mechanism.
Figure 2B:
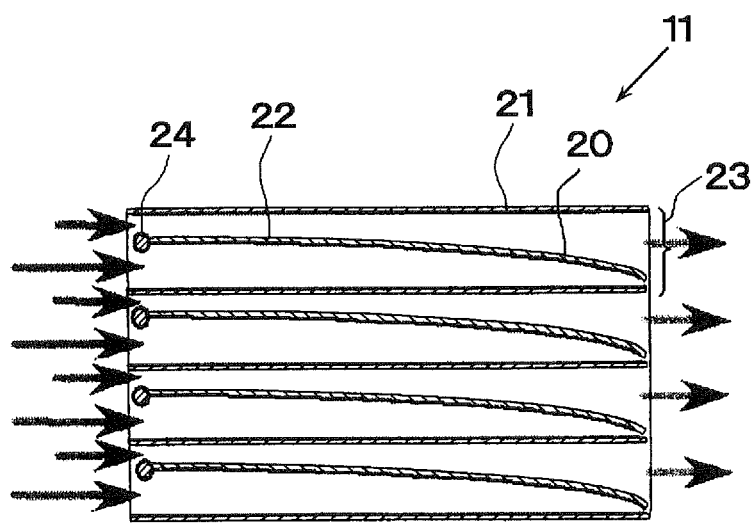

FIGS. 2A and 2B illustrate an example of utilizing, as an exemplary embodiment of the air outlet port opening level adjustment mechanism 11, a temperature-sensitive member 20 as a member provided at the air outlet port 5 and having a shape autonomously changed at an adjustment reference temperature as a boundary.

The shape of the temperature-sensitive member 20 is changed in accordance with decrease of the outlet air temperature when the outlet air temperature is lower than the adjustment reference temperature, thereby reducing the opening level of the air outlet port 5. In other words, in the air outlet port opening level adjustment mechanism 11 including the temperature-sensitive member 20, the opening level of the air outlet port 5 is adjusted by self-deformation of the temperature-sensitive member 20 at the adjustment reference temperature as the boundary.

The temperature-sensitive member 20 is formed of a material having a characteristic to change the shape at the adjustment reference temperature as the boundary. As a material having such a characteristic, for example, bimetal may be exemplified. The bimetal is a member obtained by combining different kinds of materials having different thermal expansivity, and a deformation level is suitably adjusted by combination thereof in accordance with the temperature. Furthermore, shape memory alloy or the like may also be exemplified as the material having the above-described characteristic.

The air outlet port opening level adjustment mechanism 11 illustrated in FIGS. 2A and 2B has a size fitted into or connectable to the air outlet port 5, and furthermore, the temperature-sensitive member 20 having a strip-like shape is provided at each of a plurality of regions 23 inside a housing 21 having both ends opened. Meanwhile, a wall surface of the air outlet port 5 may also be used as the housing 21.

The plurality of regions 23 inside the housing 21 is formed by dividing a passage of the cooling air passing through the air outlet port 5 into a plurality of square cylindrical regions by a separator 22 along a flow direction of the cooling air. Each of the plurality of square cylindrical regions 23 is provided with a temperature-sensitive member supporting unit 24 vertical or substantially vertical to the flow direction of the cooling air. When the outlet air temperature is higher than the adjustment reference temperature, the strip-like temperature-sensitive member 20 has one end in a longitudinal direction thereof fixed to the temperature-sensitive member supporting unit 24 in a manner such that a plane of the temperature-sensitive member becomes parallel or substantially parallel to the flow direction of the cooling air. In other words, the temperature-sensitive member 20 has one end fixed, and a non-fixed portion is provided in a manner deformable inside the region 23 (FIG. 2A).

When the outlet air temperature is lower than the adjustment reference temperature, the air outlet port opening level adjustment mechanism 11 illustrated in FIG. 2 is fitted into or connected to the air outlet port 5, thereby gradually deforming the temperature-sensitive member 20 so as to be curved in accordance with decrease of the outlet air temperature, and gradually reducing the opening level of the air outlet port 5 (FIG. 2B). Consequently, the above-described first adjustment is automatically and autonomously performed without utilizing any power source.

Additionally, deformed temperature-sensitive member 20 is gradually restored in accordance with rising of the outlet air temperature. Therefore, the opening level of the air outlet port 5 that has been reduced by the above-described first adjustment is gradually widened and restored in accordance with rising of the outlet air temperature, and the above-described second adjustment is automatically and autonomously performed without utilizing any power source.

Thus, by utilizing the temperature-sensitive member 20, the first adjustment and the second adjustment in accordance with the outlet air temperature are automatically and autonomously performed without utilizing any power source. Therefore, even in a state of power source loss, the flow rate of the cooling air is autonomously and automatically adjusted, and dew condensation is prevented from occurring on the surface of the canister 2.

Next, as other examples of the embodiment of the air outlet port opening level adjustment mechanism 11, FIGS. 3A to 5B illustrate examples of utilizing a temperature-sensitive actuator 30 provided at an air outlet port 5 as a member or a portion having a shape or a phase autonomously changed at the adjustment reference temperature as the boundary.

When the outlet air temperature is lower than the adjustment reference temperature, the temperature-sensitive actuator 30 actuates an air outlet port opening level adjustment member 12 so as to reduce the opening level of the air outlet port 5 in accordance with decrease of the outlet air temperature. In other words, in the air outlet port opening level adjustment mechanism 11 including the temperature-sensitive actuator 30, the opening level of the air outlet port 5 is adjusted by an actuation state of the temperature-sensitive actuator 30 at the adjustment reference temperature as the boundary.

As the temperature-sensitive actuator 30, selected is an actuator having a function to actuate the air outlet port opening level adjustment member 12 so as to adjust the opening level of the air outlet port 5 at the adjustment reference temperature as the boundary. As the actuator having the above-described function, for example, an actuator that utilizes deformation of bimetal, deformation of a shape memory alloy spring, or a phase change of a fluid may be exemplified.

Figure 3A:
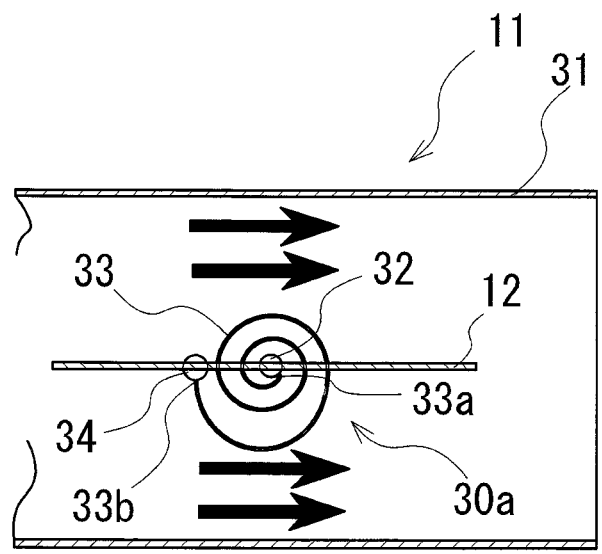
FIGS. 3A and 3B are diagrams illustrating an example of the embodiment including a temperature-sensitive actuator as the air outlet port opening level adjustment mechanism.
Figure 3B:
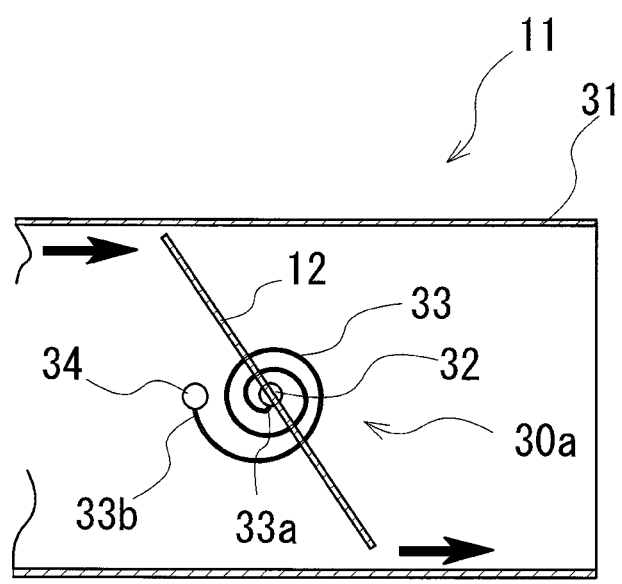

FIGS. 3A and 3B illustrate an example of the embodiment of the air outlet port opening level adjustment mechanism 11 including the temperature-sensitive actuator utilizing deformation of bimetal. The air outlet port opening level adjustment mechanism 11 illustrated in FIGS. 3A and 3B includes: a temperature-sensitive actuator 30$a$ utilizing deformation of the bimetal; and an air outlet port opening level adjustment member 12.

The temperature-sensitive actuator 30$a$ includes: a rotary shaft 32 having a size that can be fitted into or connected to the air outlet port 5 and rotatably attached to an inner wall inside a housing 31 having both ends opened; and a bimetal 33 formed in a spiral shape. Meanwhile, a wall surface of the air outlet port 5 may also be used as the housing 31.

The bimetal 33 formed in a spiral shape has an end portion on a center side 33$a$ fixed to one end side of the rotary shaft 32. The bimetal 33 has an end portion on an outer side 33$b$ fixed to a fixed shaft 34 fixed to the inner wall inside the housing 31. The bimetal 33 is a member obtained by combining different kinds of materials having different thermal expansivity, and a deformation level is suitably adjusted by combination thereof in accordance with the temperature. With this structure, the rotary shaft 32 can be rotated by deformation of the bimetal 33 along with temperature change, and can be made to function as the temperature-sensitive actuator.

On the other end side of the rotary shaft 32, the air outlet port opening level adjustment member 12 is attached. The air outlet port opening level adjustment member 12 is, for example, a plate-like member, and when the outlet air temperature does not decrease to a temperature indicating that there may be a risk of excessively cooling the canister 2, the air outlet port opening level adjustment member 12 is attached in a manner such that a plane surface thereof becomes parallel or substantially parallel to the flow direction of the cooling air (FIG. 3A).

Then, when the outlet air temperature is lower than the adjustment reference temperature, the air outlet port opening level adjustment mechanism 11 illustrated in FIGS. 3A and 3B is fitted into or connected to the air outlet port 5, thereby deforming the bimetal 33. More specifically, in the case where a low thermal expansion material is provided on an inner peripheral side and a high thermal expansion material is provided on an outer peripheral side, the bimetal 33 formed in a spiral shape shrinks toward a radially inner side, and a wound level is intensified. In an opposite case, the bimetal 33 expands toward a radially outer side, and the wound level is loosened. With this action, the rotary shaft 32 axially rotates and the air outlet port opening level adjustment member 12 is actuated, and the opening level of the air outlet port 5 is gradually reduced (FIG. 3B). Consequently, the above-described first adjustment is automatically and autonomously performed without utilizing any power source.

Additionally, the deformed bimetal 33 is gradually restored in accordance with rising of the outlet air temperature. Therefore, the opening level of the air outlet port 5 that has been reduced by the above-described first adjustment is gradually restored in accordance with rising of the outlet air temperature, and the above-described second adjustment is automatically and autonomously performed without utilizing any power source.

Figure 4A:
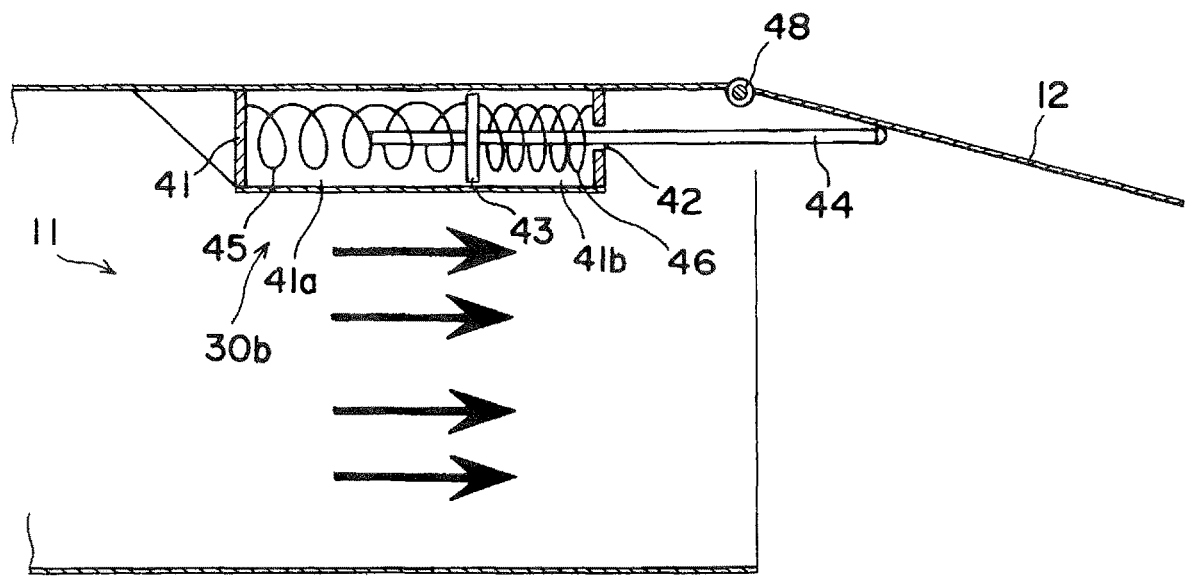
FIGS. 4A and 4B are diagrams illustrating another example of the embodiment including a temperature-sensitive actuator as the air outlet port opening level adjustment mechanism.
Figure 4B:
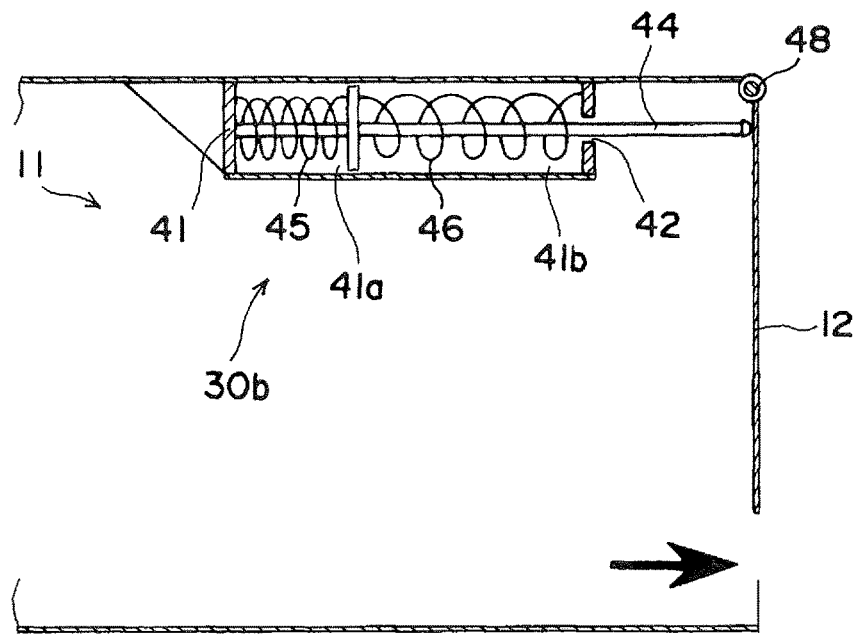

FIGS. 4A and 4B illustrate an example of the embodiment of the air outlet port opening level adjustment mechanism 11 including the temperature-sensitive actuator utilizing deformation of the shape memory alloy spring. The air outlet port opening level adjustment mechanism 11 illustrated in FIGS. 4A and 4B includes: a temperature-sensitive actuator 30$b$ utilizing deformation of the shape memory alloy spring; and the air outlet port opening level adjustment member 12.

The temperature-sensitive actuator 30$b$ is, for example, a bias type two-way actuator. More specifically, a rod 44 attached with a flange 43 is housed inside a cylindrical housing 41, and one end of the rod 44 projects from a penetration hole 42 provided at a center on one end side of the housing 41. The housing 41 is divided into two regions by the flange 43. In a region not provided with the penetration hole 42 (referred to as "first region 41$a$"), a shape memory alloy spring 45 contacts the flange 43 and also a part of the rod 44 is housed inside in an inserted state. Furthermore, in a region provided with the penetration hole (referred to as "second region 41$b$"), a bias spring 46 contacts the flange 43 and also the rod 44 is housed inside in a penetrating manner.

The housing 41 is arranged such that penetration hole 42 is oriented to an outer side of the concrete cask, and for example, provided at an inner wall of an upper portion of the air outlet port 5. In other words, the housing 41 is provided such that the first region 41$a$ is located on the inner side of the concrete cask and the second region 41$b$ is located on the outer side of the concrete cask.

The shape memory alloy spring 45 has compositions, constituent components, and the like adjusted such that biasing force is weaker than that of the bias spring 46 at the adjustment reference temperature as the boundary, and is formed in a coil spring shape. For example, as the shape memory alloy spring 45, a coil spring or the like made of Ni—Ti intermetallic compound may be exemplified. As the bias spring 46, a coil spring or the like made of austenitic stainless steel may be exemplified.

The air outlet port opening level adjustment member 12 is provided in a hanging manner so as to be able to swing in the flow direction of the cooling air via a hinge 48 provided at the upper portion of the air outlet port 5. When the outlet air temperature is higher than the adjustment reference temperature, a length of the rod 44 is set such that the opening level of the air outlet port 5 becomes substantially full-opened by pushing up the air outlet port opening level adjustment member 12 in a state that the flange 43 is pushed into the penetration hole 42 side by biasing force of the shape memory alloy spring 45 (FIG. 4A).

With the above-described structure, when the outlet air temperature is lower than the adjustment reference temperature, the biasing force of the shape memory alloy spring 45 is weakened, the shape memory alloy spring 45 is gradually compressed by the bias spring 46 via the flange 43, and the rod 44 gradually retracts to the inner side of the concrete cask. Consequently, the air outlet port opening level adjustment member 12 is gradually closed, and the opening level of the air outlet port 5 is gradually reduced (FIG. 4B). Consequently, the above-described first adjustment is automatically and autonomously performed without utilizing any power source.

Additionally, the biasing force of the shape memory alloy spring 45 becomes stronger than biasing force at the time of the first adjustment in accordance with rising of the outlet air temperature, and the rod 44 gradually projects to the outer side of the concrete cask. Consequently, the opening level of the air outlet port 5 that has been reduced by the above-described first adjustment is gradually widened and restored in accordance with rising of the outlet air temperature, and the above-described second adjustment is automatically and autonomously performed without utilizing any power source.

Figure 5A:
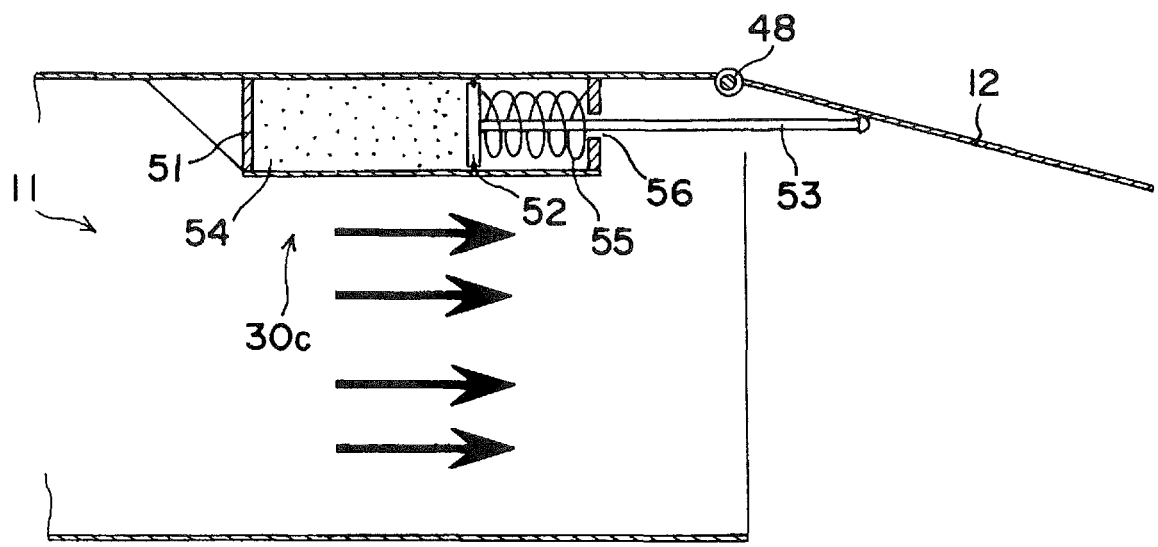
FIGS. 5A and 5B are diagrams illustrating still another example of the embodiment including a temperature-sensitive actuator as the air outlet port opening level adjustment mechanism.
Figure 5B:
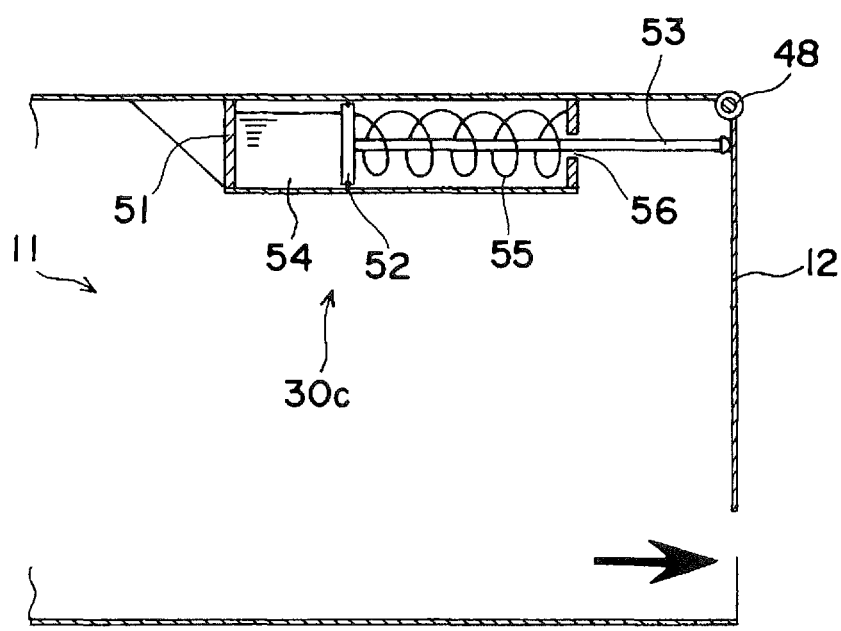

Next, FIGS. 5A and 5B illustrate an example of the embodiment of the air outlet port opening level adjustment mechanism 11 including a temperature-sensitive actuator utilizing fluid phase transition. The air outlet port opening level adjustment mechanism 11 illustrated in FIGS. 5A and 5B includes: a temperature-sensitive actuator 30c utilizing fluid phase transition; and the air outlet port opening level adjustment member 12.

The temperature-sensitive actuator 30c is, for example, a phase change type actuator. More specifically, the temperature-sensitive actuator includes: a cylinder 51; a piston 52 slidably engaged with the cylinder 51; a rod 53 fixed to one end surface of the piston 52; a containing material 54; and a spring 55. A penetration hole 56 is provided at a center of the one end side of the cylinder 51, and one end of the rod 53 projects from the penetration hole 56. The cylinder 51 is divided into two regions by the piston 52. In a region not provided with the penetration hole 56 (referred to as "first region 51a"), a containing material 54 is filled. Furthermore, in a region provided with the penetration hole 56 (referred to as "second region 51b"), the spring 55 contacts the piston 52 and also the rod 53 is housed inside in a penetrating manner.

The cylinder 51 is arranged such that the penetration hole 56 is oriented to the outer side of the concrete cask, and for example, provided at the inner wall of the upper portion of the air outlet port 5. In other words, the cylinder 51 is provided such that the first region 51a is located on the inner side of the concrete cask and the second region 51b is located on the outer side of the concrete cask.

As the containing material 54, selected is a material which is kept in a gas phase when the outlet air temperature is higher than the adjustment reference temperature, and which changes from the gas phase to a liquid phase when the outlet air temperature is lower than the adjustment reference temperature. As such a substance, low boiling point liquid such as ethanol (boiling point 78.3° C.) may be exemplified. Meanwhile, the containing material 54 may be formed by combining plural kinds of materials having different boiling points respectively.

The air outlet port opening level adjustment member 12 is provided in a hanging manner so as to be able to swing in the flow direction of the cooling air via the hinge 48 provided at the upper portion of the air outlet port 5. When the outlet air temperature is higher than the adjustment reference temperature, a length of the rod 53 is set such that the opening level of the air outlet port 5 becomes substantially full-opened by pushing up the air outlet port opening level adjustment member 12 in a state that the piston is pushed into the penetration hole 56 side by the containing material 54 in the gas phase (FIG. 5A).

With the above structure, when the outlet air temperature is lower than the adjustment reference temperature, the containing material 54 is gradually changed from the gas phase to the liquid phase and gradually reduces a volume thereof, and the rod 53 gradually retracts to an inner side of the concrete cask. Consequently, the air outlet port opening level adjustment member 12 is gradually closed, and the opening level of the air outlet port 5 is gradually reduced (FIG. 5B). Consequently, the above-described first adjustment is automatically and autonomously performed without utilizing any power source.

Furthermore, the volume of the containing material 54 is gradually increased when the containing material is gradually changed from the liquid phase to the gas phase in accordance with rising of the outlet air temperature, and the rod 53 gradually projects to the outer side of the concrete cask. Consequently, the opening level of the air outlet port 5 that has been reduced by the above-described first adjustment is gradually widened and restored in accordance with rising of the outlet air temperature, and the above-described second adjustment is automatically and autonomously performed without utilizing any power source.

Thus, by utilizing the temperature-sensitive actuator 30 also, the first adjustment and the second adjustment in accordance with the outlet air temperature are automatically and autonomously performed without utilizing any power source. Therefore, even in a state of power source loss, the flow rate of the cooling air is autonomously and automatically adjusted, and dew condensation is prevented from occurring on the surface of the canister 2.

In the following, a description will be provided for a case where the flow rate of the cooling air is adjusted by the air inlet port opening level adjustment mechanism 13 adapted to adjust an opening level of an air inlet port 3.

Figure 6:
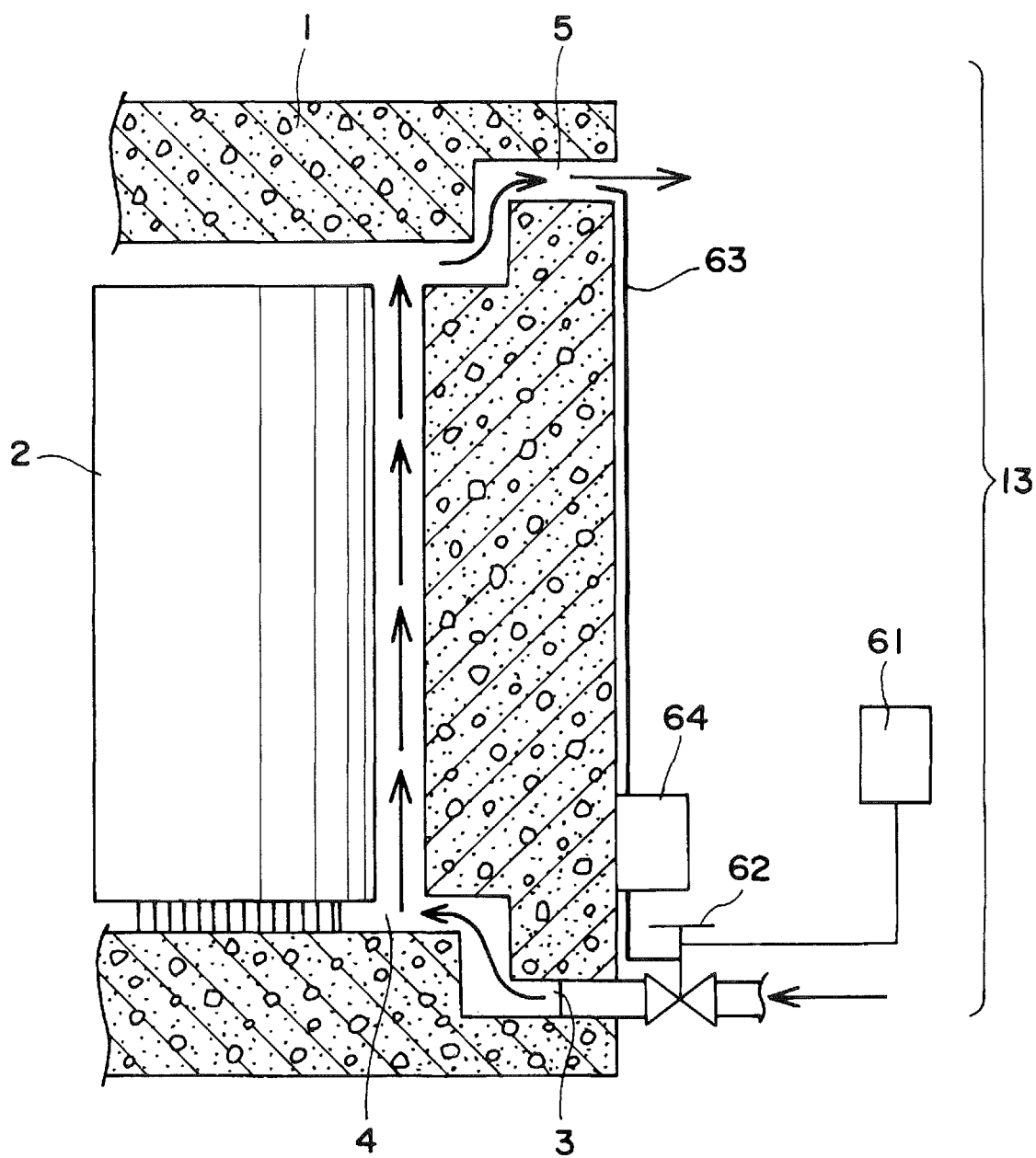
FIGS. 6 and 6A are a vertical cross-sectional views exemplifying a case including an air inlet port opening level adjustment mechanism as embodiments of the cooling air amount adjustment mechanism of a concrete cask according to the present invention.

The air inlet port opening level adjustment mechanism 13 illustrated in FIG. 6 includes: a power source 61; an air inlet port opening level adjustment unit 62; a temperature sensor 63 adapted to measure an outlet air temperature; and a control unit 64 adapted to actuate the air inlet port opening level adjustment unit 62 based on temperature information from the temperature sensor 63. Meanwhile, as the air inlet port opening level adjustment unit 62, for example, a proportional control valve such as an electric valve or a proportional solenoid valve capable of adjusting the opening level of the air inlet port 3 may be exemplified. Furthermore, as the temperature sensor 63, for example, a thermocouple or a thermistor may be possibly used.

The proportional control valve as the air inlet port opening level adjustment unit 62 receives an electric signal from the control unit 64 based on the temperature information measured by the temperature sensor 63, and an opening level thereof is adjusted. Consequently, the opening level of the air inlet port 3 is adjusted. The power source 61 is an operation power source of the air inlet port opening level adjustment unit 62.

More specifically describing adjustment of the opening level of the air inlet port 3, when the outlet air temperature measured by the temperature sensor 63 is lower than the adjustment reference temperature, the air inlet port opening level adjustment unit 62 is controlled by the control unit 64 such that the opening level of the air inlet port 3 is reduced in accordance with decrease of the outlet air temperature. Therefore, the above-described first adjustment is automatically performed by control of the air inlet port opening level adjustment unit 62 based on the outlet air temperature information measured by the temperature sensor 63.

Furthermore, when the outlet air temperature measured by the temperature sensor 63 is higher than the adjustment reference temperature, the air inlet port opening level adjustment unit 62 is controlled by the control unit 64 so as to restore the opening level of the air inlet port 3, thereby also automatically performing the above-described second adjustment. Meanwhile, the second adjustment may be performed when the outlet air temperature measured by the temperature sensor 63 is equal to the adjustment reference temperature, or an upper limit temperature higher than the adjustment reference temperature may be preliminarily set and the second adjustment may be performed when the outlet air temperature measured by the temperature sensor 63 is the upper limit temperature. The upper limit temperature is set in a temperature range capable of keeping concrete constituting the concrete container 1 at a temperature lower than the limit temperature of the concrete.

Figure 6A:
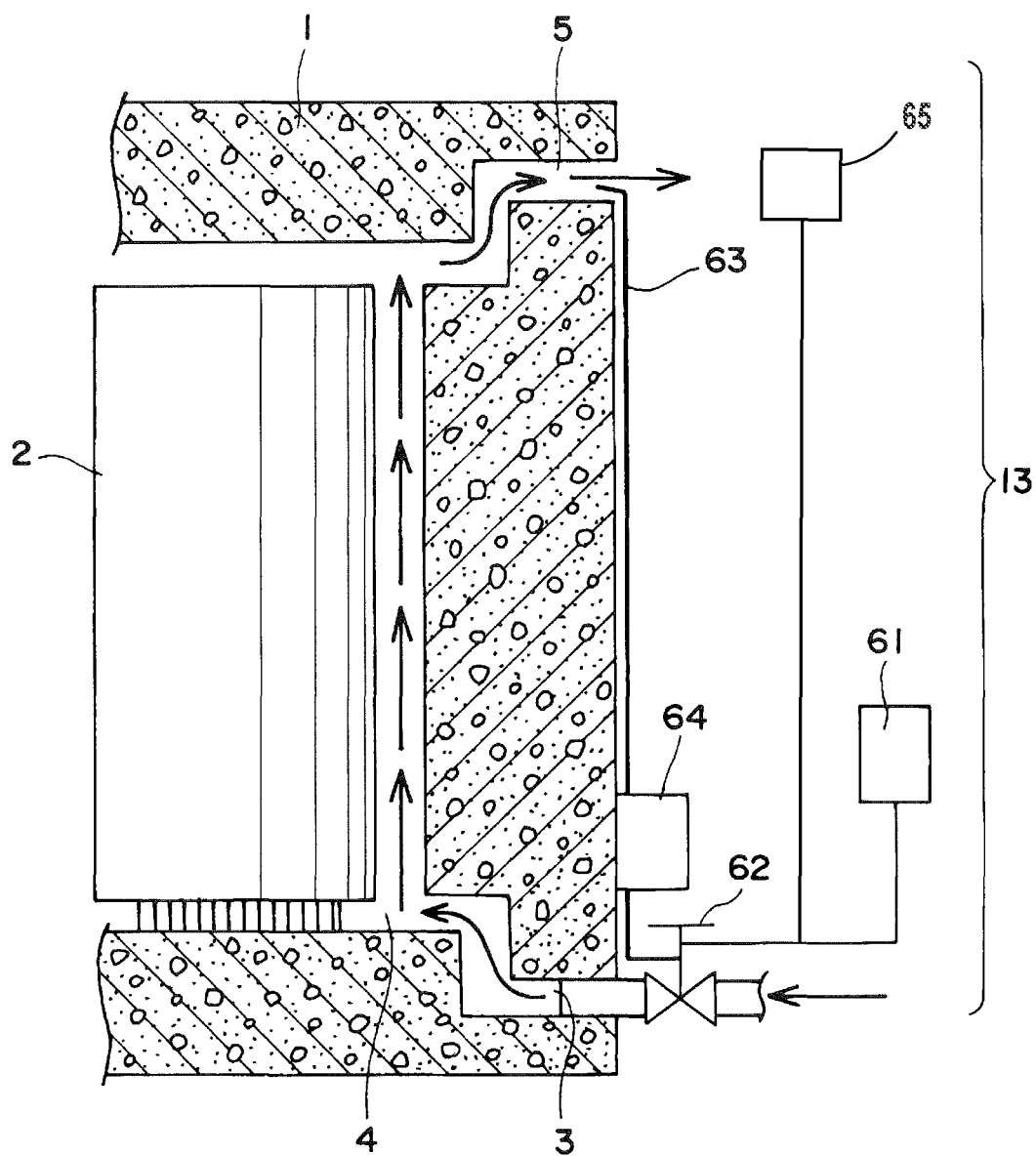

Meanwhile, the power source 61 is a commercial power source, but instead thereof, power may also be secondarily supplied by utilizing temperature difference power generation by a power generation device 65 shown in FIG. 6A. Since the concrete cask has a structure in which the external air as the cooling air is introduced from the air inlet port 3 provided at the lower portion of the concrete container 1 and the cooling air is discharged from the air outlet port 5 provided at the upper portion, the external air (especially, external air existing in a region distant from the air outlet port 5) is lower than the cooling air heated by heat generation of a canister 2. Therefore, power can be supplied by performing temperature difference power generation utilizing a Seebeck effect by using a temperature difference between the cooling air heated by heat generation of the canister 2 and the external air by the power generation device 65. In the case of adopting, as the power source 61, temperature difference power generation instead of the commercial power source, the flow rate of the cooling air can be automatically and autonomously adjusted in the same manner as the above-described embodiment utilizing the temperature-sensitive member and the temperature-sensitive actuator. Furthermore, by secondarily utilizing temperature difference power generation by the power generation device 65, the power source can be surely secured even in a state of power source loss, and the flow rate of the cooling air can be automatically and autonomously adjusted. Additionally, temperature difference power generation may also be performed by utilizing a temperature difference between an upper portion and a bottom portion of the canister 2.

Furthermore, the air inlet port opening level adjustment mechanism 13 may also formed as a mechanism provided at the air outlet port 5 and including: a member or portion having a shape or a phase autonomously changed at the adjustment reference temperature as the boundary; a link member connected or jointed to the member or the portion; and a door member connected or jointed to the link member and provided at the air inlet port 3. In this case, the link member is moved by the member or the portion having a shape or a phase autonomously changed at the adjustment reference temperature as the boundary. The door member connected or jointed to the link member is moved by movement of the link member, and the opening level of the air inlet port 3 is adjusted by movement of the door member.

Meanwhile, in the air inlet port opening level adjustment mechanism 13 illustrated in FIG. 6, preferably, a safety function is provided such that the air inlet port 3 is fully opened when the temperature of the canister 2 abnormally rises so that the outlet air temperature abnormally rises, and such that the air inlet port opening level adjustment unit 62 is fully opened when the outlet air temperature rises to a predetermined temperature or higher.

The above-described embodiment is an example of preferable embodiments of the present invention, but the present invention is not limited thereto, and various modifications can be made within a scope without departing from the gist of the present invention.

For example, in the air inlet port opening level adjustment mechanism 13 illustrated in FIG. 6, the air inlet port opening level adjustment mechanism 13 that includes the power source 61, air inlet port opening level adjustment unit 62, temperature sensor 63, and the control unit 64 has been described, however; a structure similar thereto may also applied to adjustment of an opening level of the air outlet port 5. In other words, the air outlet port opening level adjustment mechanism may be formed by applying, to the air outlet port, the structure same as the air inlet port opening level adjustment unit 62, and the air outlet port opening level adjustment mechanism may also be actuated by the control unit 64 based on the temperature information from the temperature sensor 63.

Also, as described above, only one of or the air outlet port opening level adjustment mechanism 11 and the air inlet port opening level adjustment mechanism 13 may be provide or both of them may be provided as well. In other words, the flow rate of the cooling air may also be adjusted by adjusting both the opening level of the air outlet port 5 and the opening level of the air inlet port 3.

Furthermore, generally, multiple air inlet ports 3 and air outlet ports 5 are provided respectively (for example, four). The air outlet port opening level adjustment mechanism 11 may be provided in a manner capable of adjusting the opening level of part or all of the air outlet ports 5. In the same manner, the air inlet port opening level adjustment mechanism 13 may also be provided in a manner capable of adjusting the opening level of part or all of the air inlet ports 3.

Additionally, the air inlet port opening level adjustment unit 62 is not limited to the above-described one as far as being capable of adjusting the opening level of the air inlet port 3. For example, a shutter or an opening and closing window may also be used. The same is applied to the air inlet port opening level adjustment unit.

Furthermore, in the air outlet port opening level adjustment mechanism 11 and the air inlet port opening level adjustment mechanism 13, when the temperature of the canister abnormally rises so that the outlet air temperature abnormally rises, it is preferable to take measures so as to fully open the air outlet port 5. For example, in the air outlet port opening level adjustment mechanism 11 illustrated in FIGS. 2A and 2B, preferably, the separator 22 and the temperature-sensitive member supporting unit 24 are formed of low melting point metals. In the air outlet port opening level adjustment mechanism 11 illustrated in FIGS. 3A and 3B, preferably, the rotary shaft 32 or a member and the like connecting the rotary shaft 32 to the air outlet port opening level adjustment member 12 are formed of low melting point metals. In the air outlet port opening level adjustment mechanisms 11 illustrated in FIGS. 4A to 5B, preferably, the hinge 48 is formed of a low melting point metal. By adopting such measures, when the temperature of the canister 2 abnormally rises so that the outlet air temperature abnormally rises, the low melting point metal is melted and the air outlet port 5 is substantially fully opened. Therefore, cooling performance for the canister 2 at the time of abnormality can be secured.

What is claimed is:

1. A cooling air amount adjustment device of a concrete cask, configured to: naturally convect external air as cooling air from an air inlet port provided at a lower portion of a concrete container to an air outlet port provided at an upper portion thereof; and store and simultaneously cool a canister sealing spent nuclear fuel, the device comprising at least one air outlet port opening level adjustment mechanism or at least one air inlet port opening level adjustment mechanism, which is configured to automatically perform:
  adjustment to reduce a flow rate of the cooling air when a temperature of the cooling air at the air outlet port is lower than an adjustment reference temperature, and
  adjustment to increase the flow rate of the cooling air so as to restore the flow rate of the cooling air when the temperature of the cooling air at the air outlet port is higher than the adjustment reference temperature,
wherein the at least one air outlet port opening level adjustment mechanism or the at least one air inlet port opening level adjustment mechanism comprises:
  a rotary shaft connected to the air inlet port or to the air outlet port; and
  a bimetal portion forming a spiral fixed to the rotary shaft, wherein the spiral is configured to unwind in response to a change in temperature causing the rotary shaft to rotate to reduce the flow rate of the cooling air.

2. The cooling air amount adjustment device of a concrete cask according to claim 1, wherein the air outlet port opening level adjustment mechanism includes a member or a portion provided at the air outlet port and having a shape or a phase autonomously changed at the adjustment reference temperature as a boundary.

3. The cooling air amount adjustment device of a concrete cask according to claim 1, wherein the air inlet port opening level adjustment mechanism includes a member or a portion provided at the air outlet port and having a shape or a phase autonomously changed at the adjustment reference temperature as a boundary.

4. The cooling air amount adjustment device of a concrete cask according to claim 1, wherein the air outlet port opening level adjustment mechanism includes a temperature-sensitive member configured to change a shape and adjust an opening level of the air outlet port at the adjustment reference temperature as a boundary.

5. The cooling air amount adjustment device of a concrete cask according to claim 1, comprising the at least one air outlet port opening level adjustment mechanism, wherein the spiral unwinds to cause the rotary shaft to rotate so as to adjust the opening level of the air outlet port at the adjustment reference temperature.

6. The cooling air amount adjustment device of a concrete cask according to claim 1, wherein the air outlet port opening level adjustment mechanism includes:
  a power source;
  an air outlet port opening level adjustment unit;
  a temperature sensor configured to measure a temperature of the cooling air at the air outlet port; and
  a control unit configured to actuate the air outlet port opening level adjustment unit so as to reduce the opening level of the air outlet port when the temperature measured by the temperature sensor is lower than the adjustment reference temperature and furthermore so as to restore the opening level of the air outlet port when the temperature measured by the temperature sensor is higher than the adjustment reference temperature.

7. The cooling air amount adjustment device of a concrete cask according to claim 6, wherein an apparatus configured to generate power by a temperature difference between the cooling air heated by heat generation from the canister and external air is provided instead of the power source or together with the power source.

8. A concrete cask comprising the cooling air adjustment device of a concrete cask according to claim 1.

9. The cooling air amount adjustment device of a concrete cask according to claim 1, wherein the air outlet port opening level adjustment mechanism comprises an air outlet port opening level adjustment member and a temperature-sensitive actuator configured to actuate the air outlet port opening level adjustment member so as to adjust the opening level of the air outlet port, and
  wherein the temperature-sensitive actuator comprises a spring formed from a shape memory alloy configured to deform to adjust a position of the air outlet port opening level adjustment member.

10. The cooling air amount adjustment device of a concrete cask according to claim 1, wherein the air outlet port opening level adjustment mechanism comprises an air outlet port opening level adjustment member and a temperature-sensitive actuator configured to actuate the air outlet port opening level adjustment member so as to adjust the opening level of the air outlet port, and
  wherein the temperature-sensitive actuator comprises a material configured to change phase in response to changes in temperature to adjust a position of the air outlet port opening level adjustment member.

11. The cooling air amount adjustment device of a concrete cask according to claim 10, wherein the material configured to change phase comprises ethanol.

* * * * *